(12) United States Patent
Yang

(10) Patent No.: US 7,437,747 B2
(45) Date of Patent: Oct. 14, 2008

(54) CLAMPING DEVICE FOR OPTICAL DISC APPARATUS

(75) Inventor: Chin-Sung Yang, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 277 days.

(21) Appl. No.: 11/309,338

(22) Filed: Jul. 27, 2006

(65) Prior Publication Data

US 2007/0105413 A1    May 10, 2007

(30) Foreign Application Priority Data

Nov. 4, 2005    (CN) .................... 2005 1 0101038

(51) Int. Cl.
*G11B 17/03* (2006.01)

(52) U.S. Cl. .................................. 720/706

(58) Field of Classification Search ............ 720/706, 720/622, 713, 703, 715, 619, 704
See application file for complete search history.

(56) References Cited

U.S. PATENT DOCUMENTS

| 4,705,279 | A | * | 11/1987 | Mizukami et al. ........ 279/2.02 |
| 5,467,338 | A | * | 11/1995 | Song ..................... 720/706 |
| 5,761,186 | A | * | 6/1998 | Mushika et al. .......... 720/704 |
| 5,796,709 | A | * | 8/1998 | Ootsuka .................. 720/704 |
| 2001/0004342 | A1 | | 6/2001 | Noda et al. |
| 2002/0150029 | A1 | * | 10/2002 | Ezawa et al. ............. 369/271 |
| 2004/0139456 | A1 | | 7/2004 | Lin et al. |
| 2004/0268377 | A1 | | 12/2004 | Azai |

* cited by examiner

*Primary Examiner*—Allen T Cao
(74) *Attorney, Agent, or Firm*—Winston Hsu

(57) ABSTRACT

A clamping device includes a locating cap and a baseboard. The locating cap holds a magnet. The baseboard supports the locating cap. The baseboard includes a holding part and an entrance part. The holding part receives the locating cap. The entrance part is connected to the holding part, and includes a resilient part configured for being pressed by the locating cap to retreat away from a moving path along which the locating cap moves into the holding part, and for restricting the locating cap in the holding part for preventing the locating cap from moving out of the holding part if the locating cap is in the holding part.

18 Claims, 8 Drawing Sheets

CLAMPING DEVICE FOR OPTICAL DISC APPARATUS

FIELD OF THE INVENTION

The present invention generally relates to a clamping device, and more particularly to a clamping device of an optical disc apparatus for clamping an optical disc.

DESCRIPTION OF RELATED ART

Nowadays, optical discs, such as video compact disc (VCD), digital video/versatile disc (DVD), compact disc-read only memory (CD-ROM) etc, are widely used. Optical disc apparatuses are used for the purpose of recording information to and/or reproducing information from the optical discs. A typical optical disc apparatus generally includes a spindle motor for rotating an optical disc, and a clamping device for clamping the optical disc therein. The clamping device includes a turntable installed on the spindle motor to arrange the optical disc thereon, and a clamper formed above the turntable for clamping the optical disc between the clamper and the turntable.

Referring to FIG. 8, a clamping device 1 is used for clamping an optical disc (not shown) therein, and a spindle motor (not labeled) is used for rotating the optical disc. The clamping device 999 includes a turntable 7 and a clamper 2. The turntable 7 is mounted on the spindle motor. The clamper 2 is used for clamping the optical disc on the turntable 7. The clamper 2 includes a first clamping part 20, a supporting board 22, a ring-shaped magnet 24, and a second clamping part 26. The first clamping part 20 defines three clasping holes 202 in an imaginary circle thereof. The supporting board 22 defines a guiding hole 222 therein. The second clamping part 26 includes three latches 262 for clasping the first clamping part 20 by passing through the clasping holes 202. The second clamping part 26 defines a recess portion 264 in a center thereof. The latches 262 are formed around the recess portion 264.

In assembly, the ring-shaped magnet 24 is received in the recess portion 264. The latches 262 pass through the guiding hole 222. Each latch 262 is engaged into the corresponding clasping hole 202, with the ring-shaped magnet 24 being received between the first clamping part 20 and the second clamping part 26.

However, it is difficult for operators to insert each latch 262 to the corresponding clasping hole 202, so that it is inefficient in mass production.

Therefore, a clamping device is needed in the industry to address the aforementioned deficiencies and inadequacies.

SUMMARY OF THE INVENTION

A clamping device includes a locating cap and a baseboard. The locating cap holds a magnet. The baseboard supports the locating cap. The baseboard includes a holding part and an entrance part. The holding part receives the locating cap. The entrance part is connected to the holding part, and includes a resilient part configured for being pressed by the locating cap to retreat away from a moving path along which the locating cap moves into the holding part, and for restricting the locating cap in the holding part for preventing the locating cap from moving out of the holding part if the locating cap is in the holding part.

Other systems, methods, features, and advantages of the present clamping device will be or become apparent to one with skill in the art upon examination of the following drawings and detailed description. It is intended that all such additional systems, methods, features, and advantages be included within this description, be within the scope of the present device, and be protected by the accompanying claims.

BRIEF DESCRIPTION OF THE DRAWINGS

Many aspects of the present clamping device can be better understood with reference to the following drawings. The components in the drawings are not necessarily to scale, emphasis instead being placed upon clearly illustrating the principles of the present device. Moreover, in the drawings, like reference numerals designate corresponding parts throughout the several views.

DETAILED DESCRIPTION OF THE INVENTION

Reference will now be made to the drawings to describe an embodiment of the present clamping device and an embodiment of the present optical disc apparatus.

Figure 1:
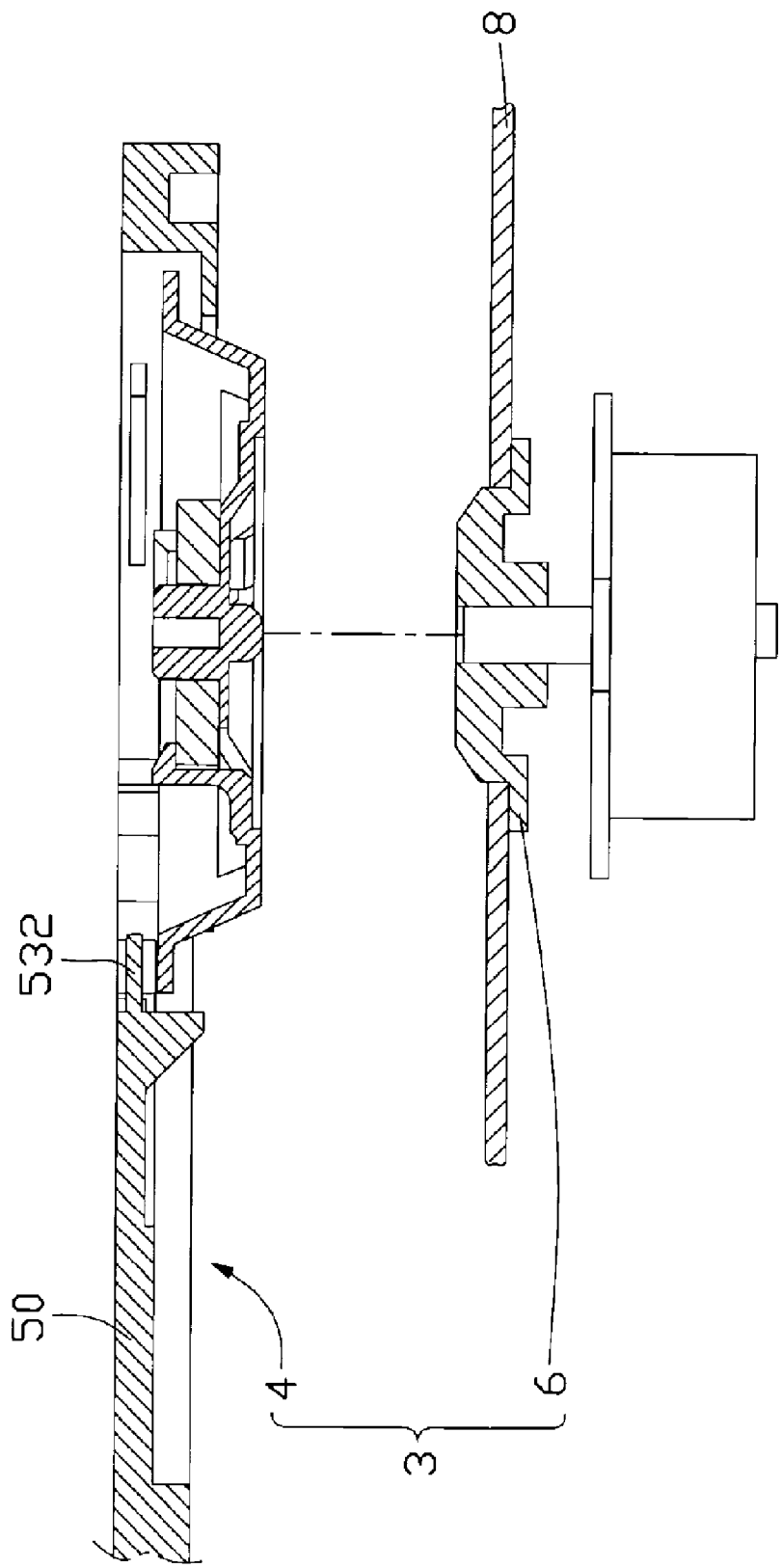
FIG. 1 is a sectional view of a optical disc apparatus with a clamping device in accordance with an exemplary embodiment, the clamping device including a clamper and a turntable.
Figure 2:
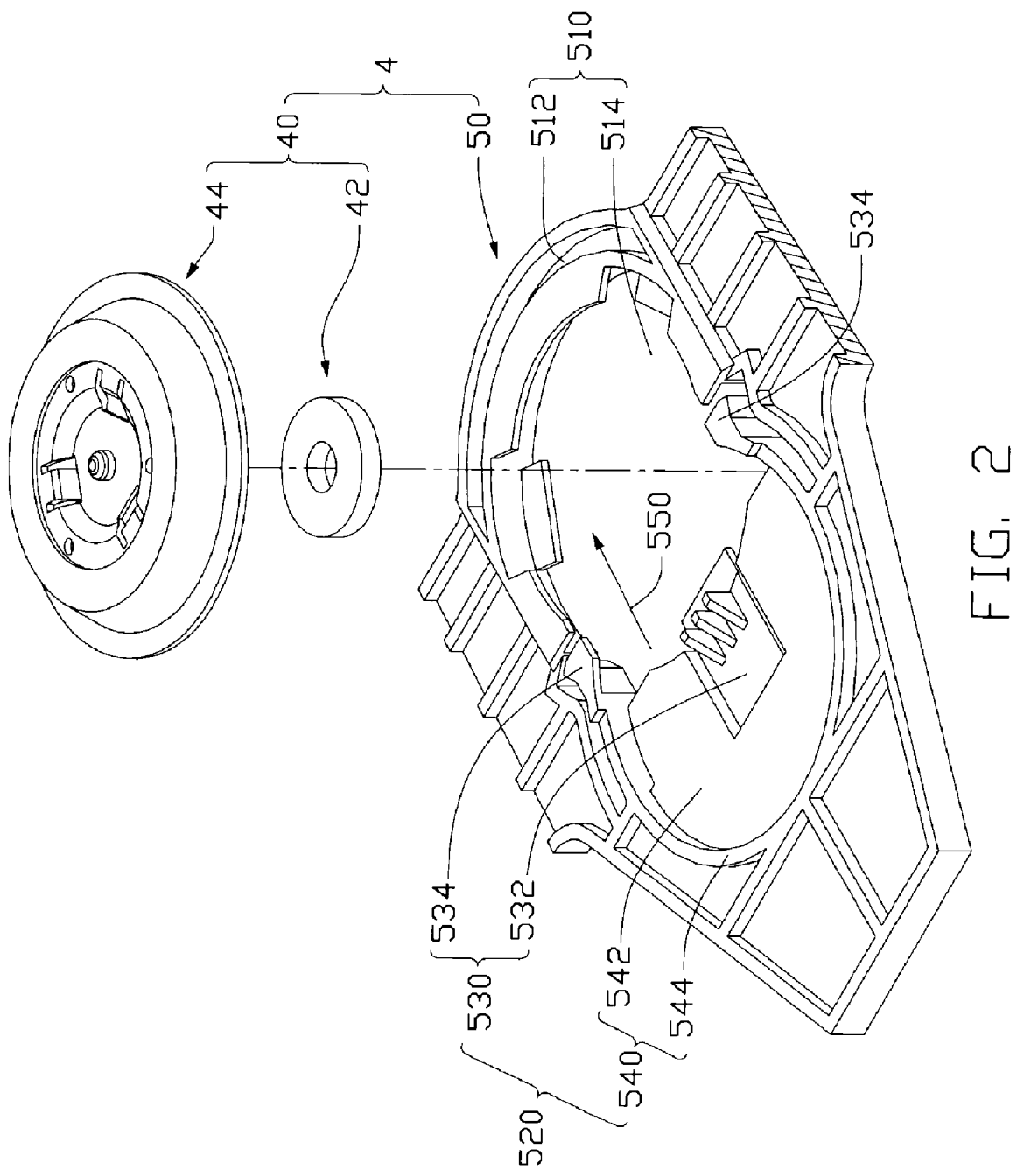
FIG. 2 is an exploded, isometric view of the clamper of FIG. 1, the clamper including a locating cap and a baseboard.

Referring to FIGS. 1 and 2, a clamping device 3 of an optical disc apparatus (not labeled) includes a clamper 4 and a turntable 6 for clamping an optical disc 8 therebetween. The clamper 4 includes a baseboard 50, a locating cap 44 attached to the baseboard 50, and a magnet 42 received in the locating cap 44.

Figure 3:
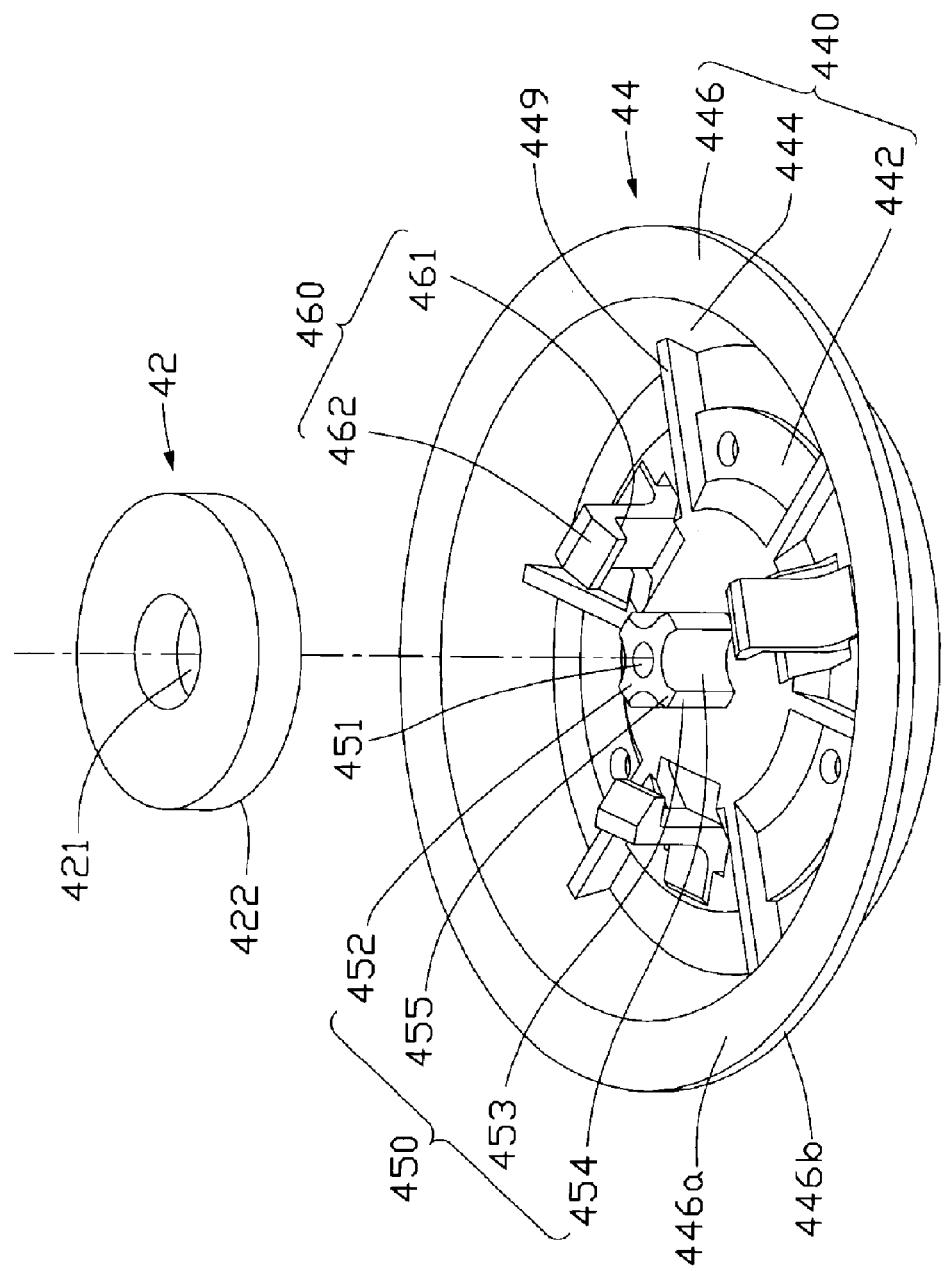
FIG. 3 is an exploded, isometric view of the locating cap of FIG. 2, viewed from an inverted aspect.

Referring to FIG. 3, the magnet 42 is cylindrical. A guiding hole 421 is defined in the magnet 42 along a longitudinal axis as shown with a dashed line. Two annular surfaces 422 are formed at two opposite sides of the magnet 42.

The locating cap 44 includes a main body 440, a locating post 450, and a plurality of L-shaped fasteners 460. The main body 440 is bowl-shaped, and generally includes a bottom portion 442, a sidewall 444, and a rim 446 that is annular. The locating post 450 is formed on a center of the bottom portion 442, and the fasteners 460 are formed at uniform intervals on the bottom portion 442 around an imaginary circle that has a center point (not shown) on the longitudinal axis. The rim 446 includes a top surface 446a parallel to the bottom portion 442 and a side surface 446b adjoining the top surface 446a.

The locating post 450 defines a center hole 451 along a longitudinal axis thereof. The locating post 450 includes a cross surface 452 at a top thereof, four alternating convex surfaces 453 and four concave surfaces 454 formed at the sides thereof, and four curved surfaces 455 smoothly connecting the cross surface 452 and the convex surfaces 453. A distance between two opposite convex surfaces 453 is greater than a diameter of the guiding hole 421 of the magnet 42.

Each fastener 460 includes two ends (not labeled). One end is integrally formed on the bottom portion 442. The other end is a hook end, and includes a fastening surface 461 facing the bottom portion 442, and a sliding slope 462 deviating from the fastening surface 461.

Figure 5:
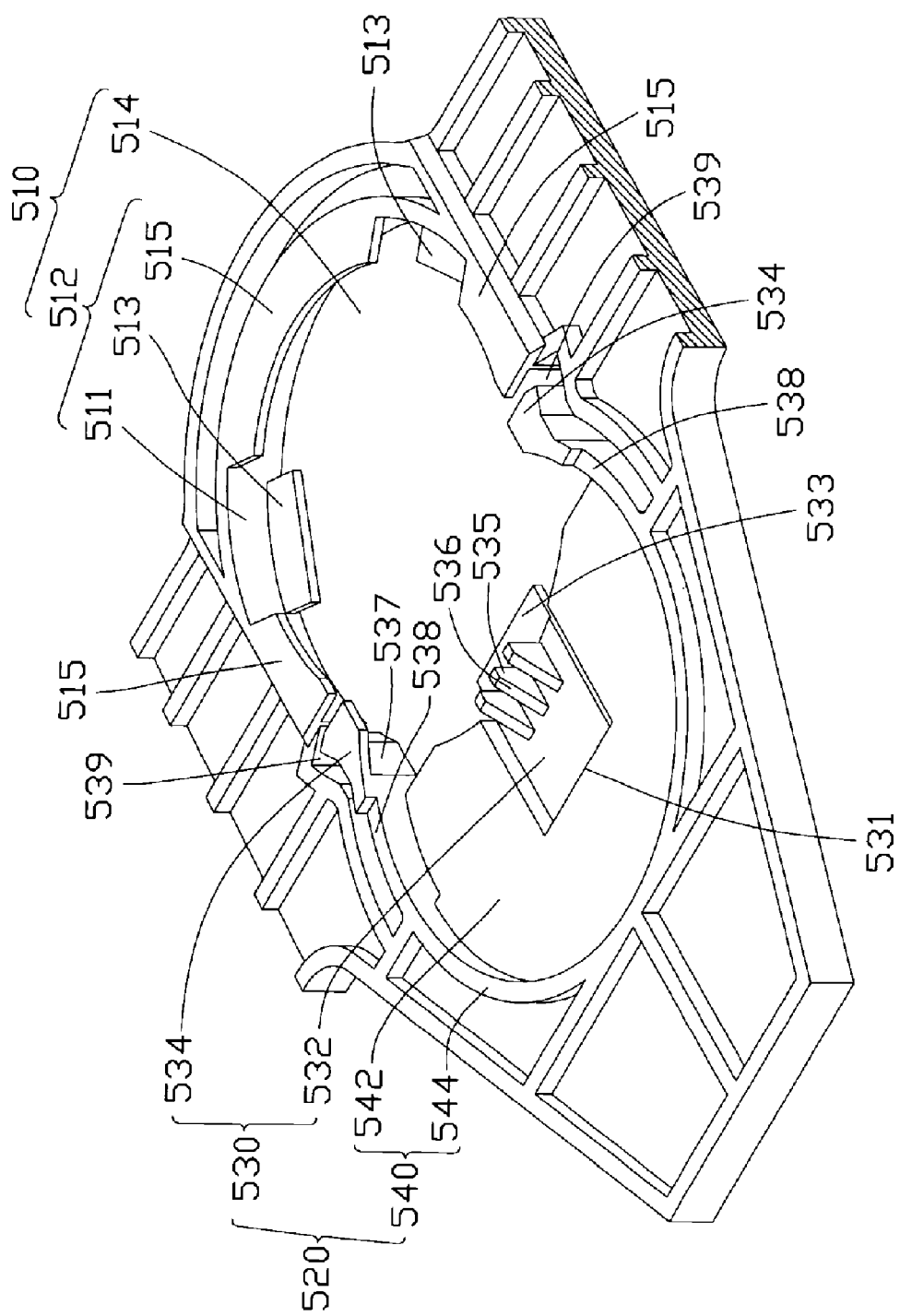
FIG. 5 is an enlarged, isometric view of the baseboard of FIG. 1.
Figure 6:
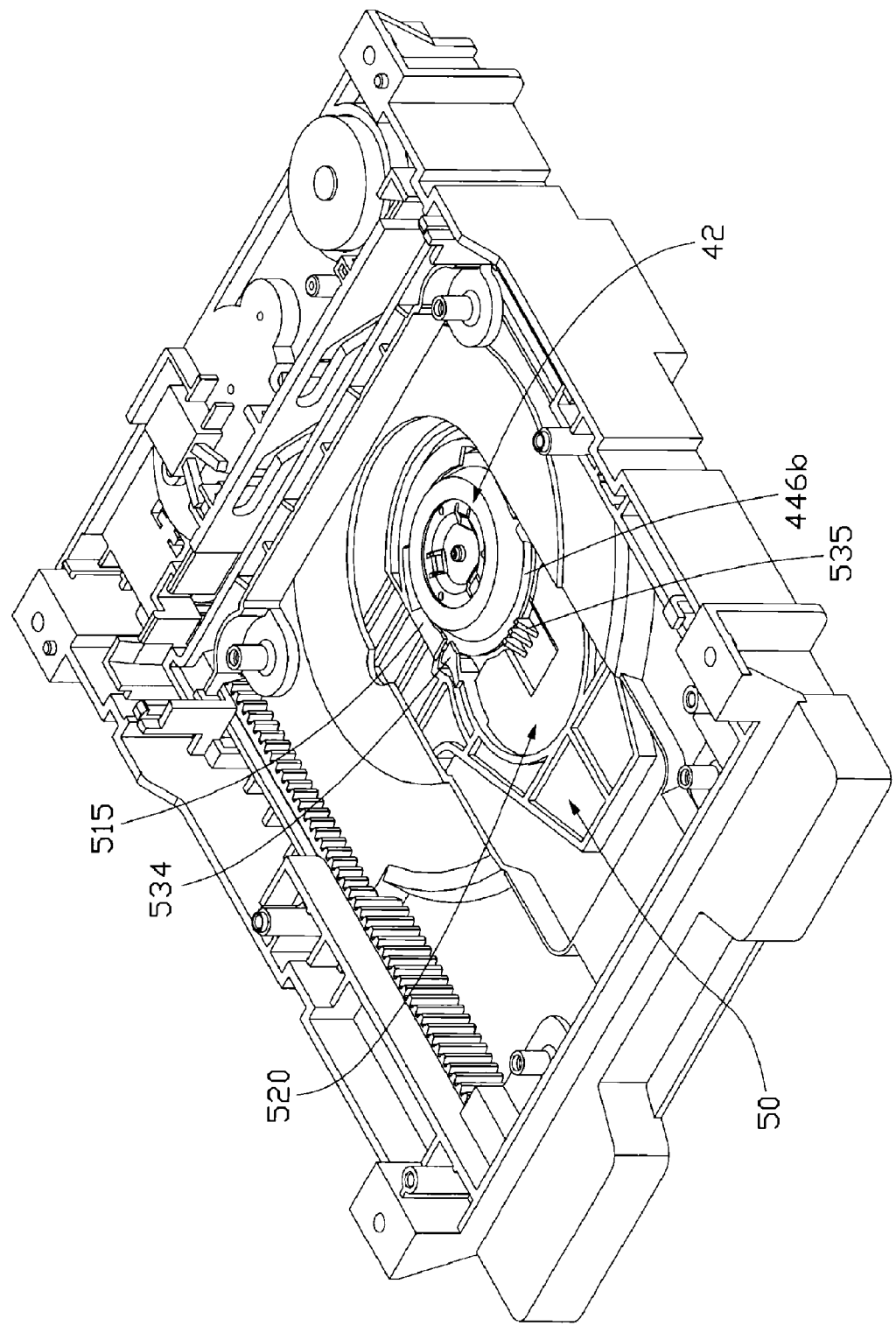
FIG. 6 is an assembled, isometric view of the optical disc apparatus of FIG. 1, with the turntable removed.
Figure 7:
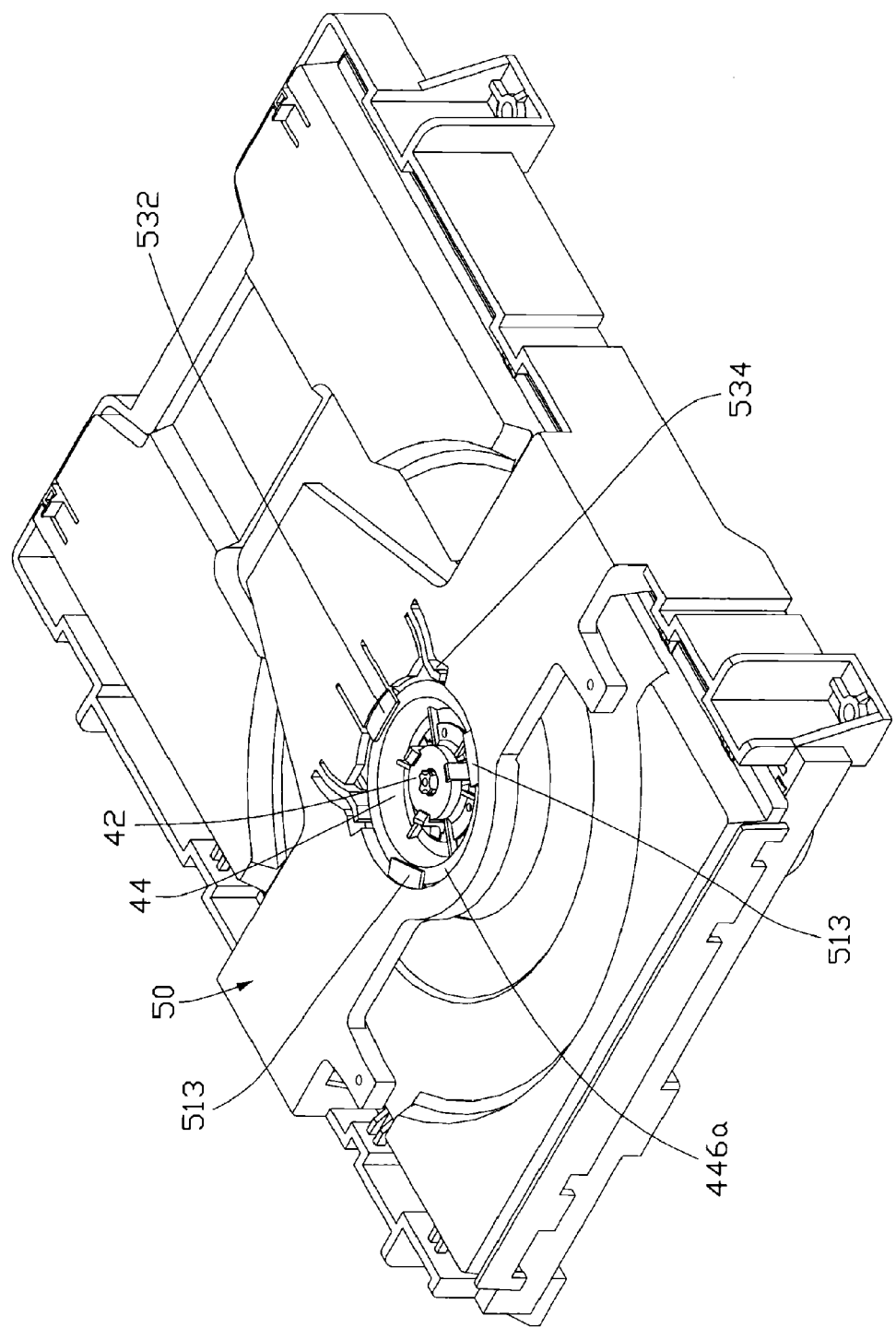
FIG. 7 is similar to FIG. 6, viewed from an inverted aspect.
Figure 8:
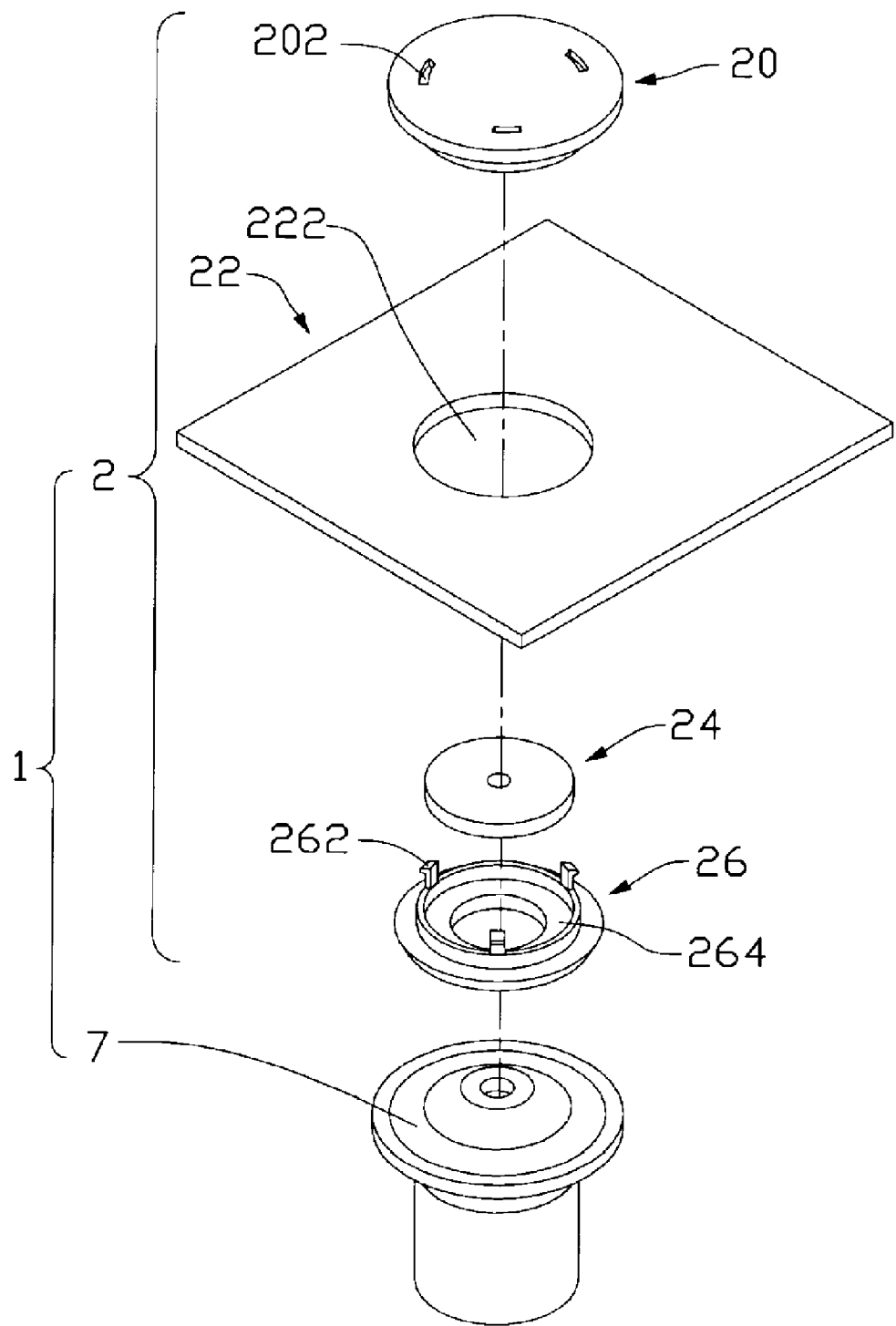
FIG. 8 is an exploded, isometric view of a conventional clamping device.

Referring to FIGS. 5, 6, and 7, the baseboard 50 includes a holding part 510 where the locating cap 44 is held, and an entrance part 520 adjoining the holding part 510. The holding part 510 of the baseboard 50 includes a frame 512 with an opening 514 for receiving the locating cap 44. The frame 512 is a circular arc, and includes a sidewall 511 substantially surrounding the opening 514 and a plurality of first blocks 513 and second blocks 515 extending from the sidewall 511 toward the opening 514. The first blocks 513 and the second blocks 515 correspondingly locate on two parallel imaginary planes (not shown).

The entrance part 520 includes a pre-supporting platform 540 for pre-supporting the locating cap 44, and a resilient part 530 between the pre-supporting platform 540 and the holding part 510. The resilient part 530 is yieldable from a moving path 550 where the locating cap 44 moves into the opening 514. When the locating cap 44 moves towards the holding part, the resilient part 530 is pressed and bent to give way to the locating cap 44. When the locating cap 44 is in the holding part 510, the resilient part 530 prevents the locating cap 44 from moving out of the opening 514.

The pre-supporting platform 540 has a semi-circular segment shape, and includes a plate 542 and a flange 544 bounding the plate 542. The flange 544 has two ends 538 located between the entrance part 520 and the holding part 510. The resilient part 530 includes a resilient board 532 attached to the plate 542, and two resilient clips 534 each correspondingly extending from the two ends 538. The pre-supporting platform 540 also defines a gap 539 abutting each resilient clip 534. A minimum distance between the resilient clips 534 is smaller than a maximal diameter of the locating cap 44.

The resilient board 532 includes a first side 531 formed firmly on the plate 542, a second side 533 extending into the opening 514. Three parallel protrusions 535 are formed on the resilient board 532. Each protrusion 535 has a first slope 536 facing the flange 544, with the first slope 536 being deflectable away from the moving path 550 of the locating cap 44. Each resilient clip 534 has a second slope 537 thereon. The second slopes 537 of the resilient clips 534 are deflectable away from the moving path 550.

Figure 4:
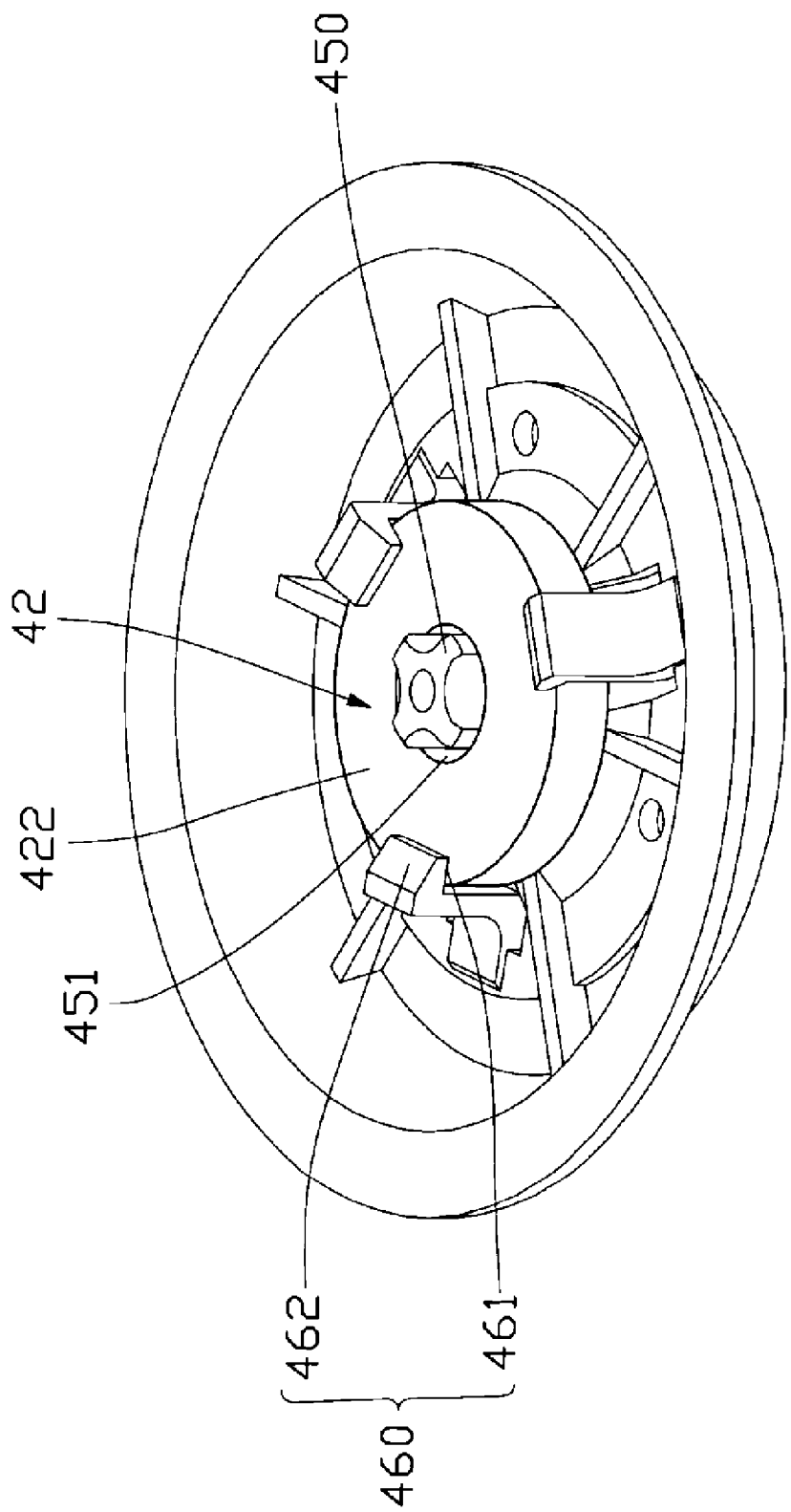
FIG. 4 is an assembled, isometric view of the locating cap of FIG. 3.

Referring to FIG. 4, in an assembly of the magnet 42 and the locating cap 44, the magnet 42 is to be installed into the locating cap 44. The sliding slope 462 of each fastener 460 is pressed by the magnet 42 to deflect outwards, while the locating post 450 is pressed by the magnet 42 to contract inwards. Therefore, the fasteners 460 give way to the magnet 42, and the locating post 450 passes through the guiding hole 421 of the magnet 42. After assembly, the fasteners 460 are restored under restoration forces, and the fastening surfaces 461 abut on one of the annular surfaces 222. The magnet 42 is firmly fastened in the locating cap 44 by a restoration force of the locating post 450.

Referring to FIGS. 2 and 5, in an assembling of the locating cap 44 and the baseboard 50, the locating cap 44 is pre-supported on the plate 542. When the locating cap 44 is moved into the holding part 510, the first slope 536 is pressed by the locating cap 44 to yield away from the moving path 550. I.e., the second side 533 rotates around the first side 531 to deflect away from the moving path 550. The second slopes 537 are also pressed by the locating cap 44 with the resilient clip retreating into the gap 539. When the first slope 536 and the second slopes 537 are pressed in the direction parallel to the moving path 550, the locating cap 44 moves into the opening 514 without any obstacles. That is, the resilient board 532 and the resilient clips 534 are pressed to give way to the locating cap 44 during assembly.

After the assembling, referring to FIGS. 1, 5, 6 and 7, the locating cap 44 is in the opening 514 with the resilient board 532 and the resilient clip 534 restricting the locating cap 44 in the holding part 510. The first blocks 513 and the second blocks 515 prevent the locating cap 44 from moving out of the opening 514 in a direction perpendicular to the disc.

It is very convenient for operators to assemble the locating cap 44 into the baseboard 50. Thus, the clamping device 3 design is superior when mass producing.

It should be emphasized that the above-described preferred embodiments, are merely possible examples of implementation of the principles of the invention, and are merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and be protected by the following claims.

What is claimed is:

1. A clamping device comprising:
    a locating cap holding a magnet, the locating cap being bowl-shaped; and
    a baseboard supporting the locating cap, the baseboard comprising:
    a holding part receiving the locating cap; and
    an entrance part being connected to the holding part, the entrance part comprising a resilient part configured for being pressed by the locating cap to yield away from a moving path along where the locating cap moves into the holding part, and for restricting the locating cap in the holding part, preventing the locating cap from moving out of the holding part when the locating cap is in the holding part.

2. The clamping device according to claim 1, wherein the resilient part comprises a resilient board with at least one first slope thereon for being pressed by the locating cap to yield away from the moving path.

3. The clamping device according to claim 2, wherein the resilient part comprises at least one resilient clip with a second slope thereon for being pressed by the locating cap to yield away from the moving path.

4. The clamping device according to claim 3, wherein the entrance part comprises a pre-supporting platform being connected to the holding part via the resilient part, for pre-supporting the locating cap.

5. The clamping device according to claim 4, wherein the pre-supporting platform comprises a plate and a flange around the plate.

6. The clamping device according to claim 5, wherein the resilient board is formed on the plate, and the resilient clip is formed on the flange.

7. A clamping device for clamping a disc in an optical disc apparatus, the clamping device comprising:
    a turntable for supporting the optical disc;
    a locating cap holding a magnet for attracting the turntable; and
    a baseboard supporting the locating cap, the baseboard comprising:
    a holding part defining an opening therein for receiving the locating cap; and an entrance part being connected to the holding part, the entrance part comprising a resilient board with at least one first slope thereon for being pressed by the locating cap to retreat if the locating cap moves into the opening, and for restricting the locating cap in the holding part.

8. The clamping device according to claim 7, wherein the entrance part comprising two resilient clips, and each resilient clip forms a second slope thereon for being pressed by the locating cap to retreat if the locating cap moves into the opening.

9. The clamping device according to claim 8, wherein the entrance part has a semi-circular segment shape, and the entrance part includes a plate and a flange around the plate.

10. The clamping device according to claim 9, wherein a first side of the resilient board is formed on the plate, and a second side of the resilient board extends into the opening, for rotating around the first side if the clamping part presses the first slope in a movement of the clamping part towards the opening.

11. The clamping device according to claim 10, wherein the resilient clips are formed on two ends of the flange.

12. The clamping device according to claim 11, wherein the locating cap has a circular shape, and a diameter of the locating cap is bigger than a distance between the resilient clips.

13. The clamping device according to claim 8, wherein the baseboard defines a gap abutting each resilient clip.

14. A clamping device comprising:
a locating cap being bowl-shaped; and
a baseboard supporting the lamping member, the baseboard comprising:
a holding part defining an opening therein, the opening receiving the locating cap;
a plate for pre-supporting the clamping member;
a flange bounding the plate; and
a resilient board attached to the plate, with at least one first slope thereon facing to the flange, the resilient board comprising:
a first side formed on the plate; and
a second side extending into the opening.

15. The clamping device according to claim 14, wherein the first slope is deflectable away from a moving path along which the clamping member moves into the opening.

16. The clamping device according to claim 15, wherein the flange has two ends between the entrance part and the holding part.

17. The clamping device according to claim 16, wherein the resilient part comprises two resilient clips respectively extending from the two ends.

18. The clamping device according to claim 17, wherein each resilient clip has a second slope thereon, and the two slopes are deflectable away from the moving path.

* * * * *